US011097689B2

(12) United States Patent
Golsch

(10) Patent No.: US 11,097,689 B2
(45) Date of Patent: Aug. 24, 2021

(54) PASSIVE ENTRY AND PASSIVE START SYSTEM AND METHOD USING TEMPORARY KEYS

(71) Applicants: DENSO International America, Inc., Southfield, MI (US); DENSO CORPORATION, Kariya (JP)

(72) Inventor: Kyle Golsch, Pontiac, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 135 days.

(21) Appl. No.: 16/359,103

(22) Filed: Mar. 20, 2019

(65) Prior Publication Data
US 2019/0299930 A1    Oct. 3, 2019

Related U.S. Application Data

(60) Provisional application No. 62/648,801, filed on Mar. 27, 2018.

(51) Int. Cl.
*B60R 25/24*    (2013.01)
*B60R 25/04*    (2013.01)
(Continued)

(52) U.S. Cl.
CPC .............. *B60R 25/24* (2013.01); *B60R 25/04* (2013.01); *B60R 25/209* (2013.01);
(Continued)

(58) Field of Classification Search
CPC ........ B60R 2325/101; B60R 2325/103; B60R 2325/205; B60R 25/04; B60R 25/209;
(Continued)

(56) References Cited

U.S. PATENT DOCUMENTS 8,032,084 B2 * 10/2011 Demirbasa ........ H04W 12/0802
455/41.2
8,271,662 B1 * 9/2012 Gossweiler, III ... H04M 1/6066
709/227
(Continued)

FOREIGN PATENT DOCUMENTS

BR    102014017465 A2    2/2016
CN       104574593 A    4/2015
(Continued)

*Primary Examiner* — Behrang Badii
*Assistant Examiner* — Daniel L Greene
(74) *Attorney, Agent, or Firm* — Harness, Dickey & Pierce, P.L.C.

(57) ABSTRACT

A system includes a communication module configured to establish a first secure communications link with a portable device and a second secure communications link with a contactless smartcard. The contactless smartcard includes a unique identification (ID). A memory module configured to store information associated with the portable device and the contactless smartcard. A temporary key module configured to store the ID of the contactless smartcard and vehicle operation limitations associated with the ID of the contactless smartcard in the memory module. An authentication module configured to (i) authenticate the portable device and (ii) authenticate the contactless smartcard. A passive entry/passive start (PEPS) module configured to receive authentication of at least (i) the portable device or (ii) the contactless smartcard from the authentication module, and perform a vehicle operation based on at least (i) the received authentication and (ii) the vehicle operation limitations stored in the memory module.

20 Claims, 5 Drawing Sheets

(51) Int. Cl.
   *B60R 25/20* (2013.01)
   *G06K 7/10* (2006.01)
   *H04W 12/04* (2021.01)
   *H04W 12/06* (2021.01)
   *G08C 17/02* (2006.01)
   *G07C 9/00* (2020.01)
   *H04W 12/03* (2021.01)

(52) U.S. Cl.
   CPC ..... *G06K 7/10366* (2013.01); *G07C 9/00174* (2013.01); *G07C 9/00309* (2013.01); *G07C 9/00857* (2013.01); *G08C 17/02* (2013.01); *H04W 12/03* (2021.01); *H04W 12/04* (2013.01); *H04W 12/06* (2013.01); *B60R 2325/101* (2013.01); *B60R 2325/103* (2013.01); *B60R 2325/205* (2013.01); *G07C 2009/00793* (2013.01); *G07C 2209/04* (2013.01); *G07C 2209/08* (2013.01); *G08C 2201/93* (2013.01); *G08C 2201/94* (2013.01)

(58) Field of Classification Search
   CPC ................ B60R 25/24; G06K 7/10366; G06K 2009/00793; G06K 2209/04; G06K 2209/08; G06K 9/00174; G06K 9/00309; G06K 9/00857; G08C 17/02; G08C 2201/93; G08C 2201/94; H04W 12/001; H04W 12/04; H04W 12/06
   See application file for complete search history.

(56) References Cited

U.S. PATENT DOCUMENTS

| | | | |
|---|---|---|---|
| 8,930,045 | B2 | 1/2015 | Oman et al. |
| 9,123,244 | B2 | 9/2015 | Daman et al. |
| 9,688,247 | B1 | 6/2017 | Jayaraman et al. |
| 9,794,753 | B1 | 10/2017 | Stitt et al. |
| 9,894,492 | B1 | 2/2018 | Elangovan et al. |
| 10,002,479 | B2 | 6/2018 | Oz et al. |
| 10,747,872 | B1 * | 8/2020 | Ha ................... G06F 9/4406 |
| 2006/0214766 | A1 * | 9/2006 | Ghabra ............. G07C 9/00309 340/5.25 |
| 2011/0215921 | A1 | 9/2011 | Ben Ayed et al. |
| 2012/0045058 | A1 | 2/2012 | Weghaus |
| 2013/0214732 | A1 | 8/2013 | Nowottnick |
| 2014/0058586 | A1 | 2/2014 | Kalhous et al. |
| 2014/0152091 | A1 | 6/2014 | Muller et al. |
| 2014/0169564 | A1 * | 6/2014 | Gautama ........... G07C 9/00309 380/270 |
| 2014/0188348 | A1 | 7/2014 | Gautama et al. |
| 2014/0240091 | A1 | 8/2014 | Talty et al. |
| 2014/0274013 | A1 | 9/2014 | Santavicca |
| 2014/0330449 | A1 | 11/2014 | Oman et al. |
| 2015/0084745 | A1 * | 3/2015 | Hertz ................... H04W 4/024 340/10.3 |
| 2015/0145648 | A1 * | 5/2015 | Winkelman ............ B60R 25/24 340/5.72 |
| 2015/0148989 | A1 | 5/2015 | Cooper et al. |
| 2015/0161832 | A1 | 6/2015 | Esselink et al. |
| 2015/0161834 | A1 | 6/2015 | Spahl et al. |
| 2015/0310681 | A1 | 10/2015 | Avery et al. |
| 2015/0356797 | A1 | 12/2015 | McBride et al. |
| 2016/0050563 | A1 | 2/2016 | Bronk |
| 2016/0063786 | A1 | 3/2016 | Lewis et al. |
| 2016/0087485 | A1 | 3/2016 | Maeda et al. |
| 2016/0150407 | A1 | 5/2016 | Michaud et al. |
| 2017/0018128 | A1 | 1/2017 | Berezin et al. |
| 2017/0062938 | A1 | 3/2017 | Cheng et al. |
| 2017/0104589 | A1 | 4/2017 | Lambert et al. |
| 2017/0132533 | A1 | 5/2017 | Darnell et al. |
| 2017/0136991 | A1 | 5/2017 | Avery et al. |
| 2017/0236351 | A1 | 8/2017 | Menard et al. |
| 2017/0303080 | A1 | 10/2017 | Stitt et al. |
| 2017/0303090 | A1 | 10/2017 | Stitt et al. |
| 2017/0309098 | A1 | 10/2017 | Watters et al. |
| 2017/0330402 | A1 | 11/2017 | Menard et al. |
| 2017/0352214 | A1 * | 12/2017 | Maiwand ........... G07C 9/00857 |
| 2017/0352215 | A1 * | 12/2017 | Maiwand ........... G07C 9/00309 |
| 2018/0009416 | A1 * | 1/2018 | Maiwand ........... G07C 9/00571 |
| 2018/0029560 | A1 | 2/2018 | Mohaupt et al. |
| 2018/0099643 | A1 | 4/2018 | Golsch et al. |
| 2018/0103414 | A1 | 4/2018 | Golsch |
| 2018/0126952 | A1 | 5/2018 | Niemiec |
| 2018/0154865 | A1 | 6/2018 | Bianchi, III et al. |
| 2018/0265039 | A1 * | 9/2018 | Jain ................... G07C 9/00309 |
| 2018/0268629 | A1 * | 9/2018 | Jain ........................ G07C 9/28 |
| 2018/0269565 | A1 | 9/2018 | Guthrie et al. |
| 2019/0152435 | A1 * | 5/2019 | Ujkashevic ............ G06Q 50/30 |

FOREIGN PATENT DOCUMENTS

| | | |
|---|---|---|
| EP | 2800068 A2 | 11/2014 |
| FR | 3026212 A1 | 3/2016 |
| WO | WO-2015177298 A1 | 11/2015 |
| WO | WO-16156682 A1 | 10/2016 |
| WO | WO-2017/181035 A1 | 10/2017 |
| WO | WO-2017/181050 A1 | 10/2017 |
| WO | WO-18040641 A1 | 3/2018 |

* cited by examiner

PASSIVE ENTRY AND PASSIVE START SYSTEM AND METHOD USING TEMPORARY KEYS

CROSS-REFERENCE TO RELATED APPLICATION

This application claims the benefit of U.S. Provisional Application No. 62/648,801, filed on Mar. 27, 2018. The entire disclosure of the above application is incorporated herein by reference.

FIELD

The present disclosure relates to passive entry/passive start (PEPS) systems and methods for a vehicle and, more specifically, to PEPS systems and methods using temporary keys.

BACKGROUND

In general, a PEPS system allows anyone in possession of a key fob that has been previously paired with a vehicle's central PEPS electronic control unit (ECU) to access the vehicle by simply grabbing a door handle and to start the vehicle with a push of a button. In response to a button push, the central PEPS ECU authenticates the key fob to determine if the key fob is authorized to access the vehicle. If the key fob can be authenticated, the vehicle's function is made available to the user (i.e. doors are unlocked or vehicle is started).

Some PEPS systems allow a driver to use a portable device, e.g. smartphone, as the key fob. As an example, U.S. Non-Provisional application Ser. No. 15/730,265, filed on Oct. 11, 2017, published as U.S. Pub. No. 2018/0099643, on Apr. 12, 2018, discloses the use of Bluetooth low energy (BLE) communications and impulse radio ultra-wide band communications to enable a portable device to be used in place of a key fob in a PEPS system, and is incorporated herein by reference. Although PEPS systems that use an owner's portable device as a key fob may provide many conveniences, they also create potential security risks for the owner's portable device. For example, when the owner needs to allow another driver, e.g. valet attendant, to operate the vehicle, they must give their portable device to the other driver. Thus, creating a security hazard by providing a potential stranger access to their portable device.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a communication module configured to establish a first secure communications link with a portable device and establish a second secure communications link with a contactless smartcard. The contactless smartcard includes a unique identification (ID). A memory module configured to store information associated with the portable device and the contactless smartcard. A temporary key module configured to store the ID of the contactless smartcard in the memory module and store vehicle operation limitations associated with the ID of the contactless smartcard in the memory module. An authentication module configured to (i) authenticate the portable device and (ii) authenticate the contactless smartcard. A passive entry/passive start (PEPS) module configured to receive authentication of at least (i) the portable device or (ii) the contactless smartcard from the authentication module, and perform a vehicle operation based on at least (i) the received authentication and (ii) the vehicle operation limitations stored in the memory module.

A method includes establishing a first secure communications link with a portable device and establishing a second secure communications link with contactless smartcard. The contactless smartcard includes a unique identification (ID). The method further includes storing information associated with the contactless smartcard. The information includes (i) the ID of the contactless smartcard and (ii) vehicle operation limitations associated with the ID of the contactless smartcard. The method also includes authenticating (i) the portable device and (ii) the contactless smartcard. The method further includes performing a vehicle operation based on at least (i) the authentication of the portable device or the authentication of the contactless smartcard and (ii) the stored vehicle operation limitations.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Example embodiments will now be described more fully with reference to the accompanying drawings.

The present disclosure relates to systems, methods, and architecture to implement a PEPS system that uses temporary keys. Specifically, the present disclosure relates to a PEPS system using a contactless smartcard as a temporary key. Further, the present disclosure applies to vehicle systems with keyless systems, generally referred to as PEPS systems or keyless entry and keyless go systems. In this way, the present disclosure provides a PEPS system that enables an owner to create secure temporary keys that can be given to an additional operator of the vehicle, e.g. a valet attendant.

As discussed in detail below, the PEPS systems of the present disclosure includes a memory module that stores information associated with each temporary key. The memory module, for example, includes a challenge response algorithm for authentication of the temporary key. In this way, as discussed in detail below, the present disclosure describes secure and convenient methods to create temporary keys for use with a PEPS system.

Figure 1:
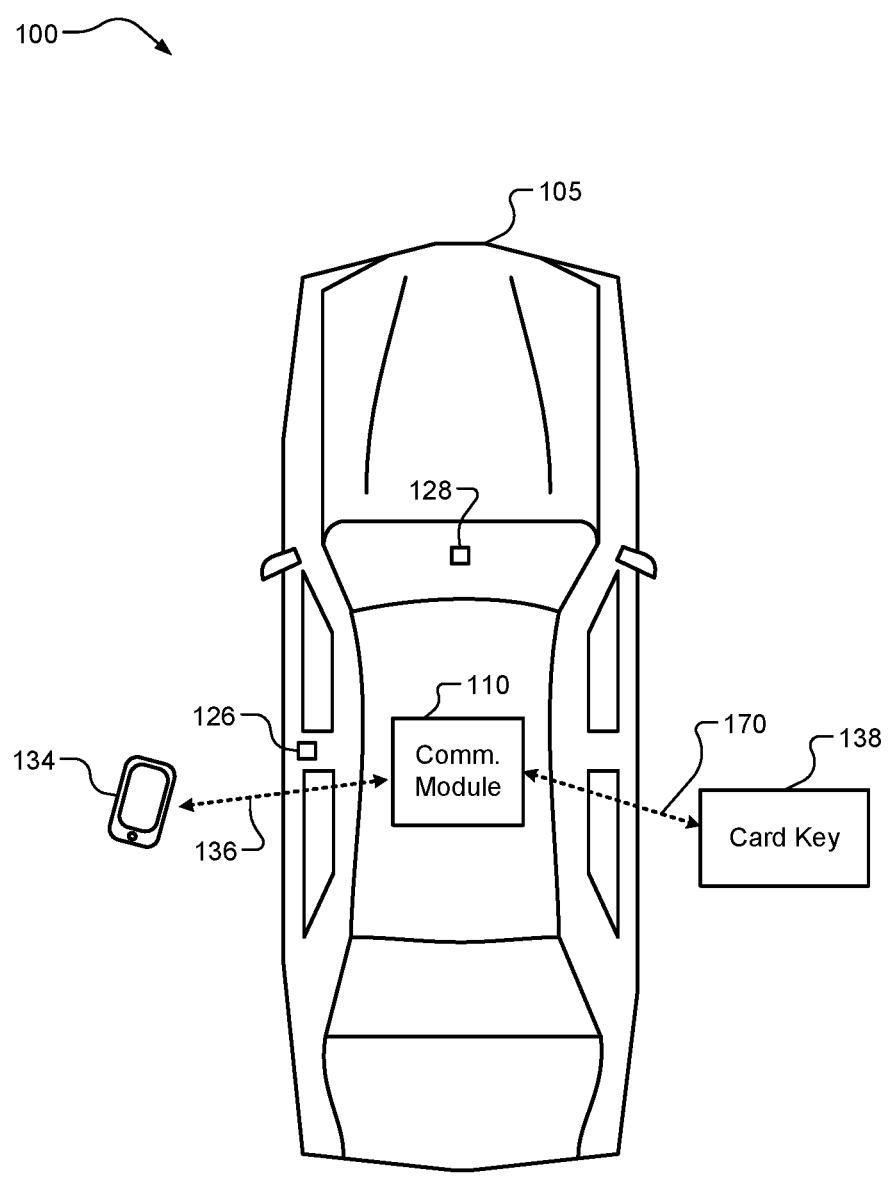
FIG. 1 illustrates a subject vehicle with a PEPS system according to the present disclosure.
Figure 2:
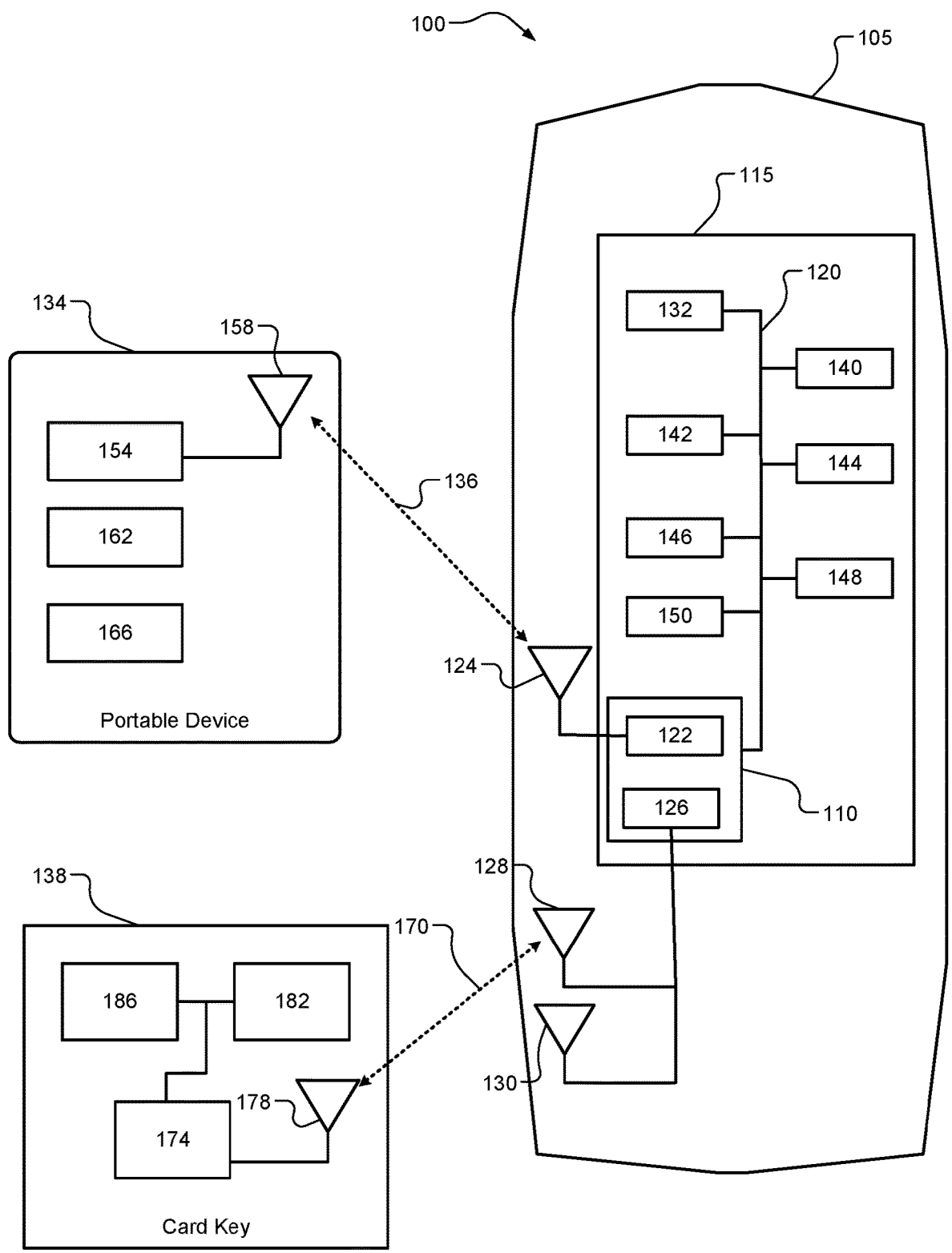
FIG. 2 illustrates a block diagram for a PEPS system according to the present disclosure.

With reference to FIGS. 1 and 2, a PEPS system 100 is provided within a vehicle 105 and includes a communication module 110. The PEPS system 100 includes one or more vehicle modules 115 that are distributed throughout the vehicle 105 and are able to communicate with each other through, for example, a vehicle interface 120. In addition, some of the modules may be integrated into a single ECU and are able to communicate with each other using the vehicle interface 120. The vehicle interface 120, for example, may include a controller area network (CAN) bus for communication between the modules. The vehicle interface 120 can also include a clock extension peripheral interface (CXPI) bus. Additionally or alternatively, the vehicle interface 120 can include a combination of CAN bus and CXPI bus communication interfaces.

The vehicle modules 115 can include, for example, the communication module 110 that includes a Bluetooth Low Energy (BLE) chipset 122 connected to a first antenna 124. While communication using the BLE communication protocol is described, other wireless communication protocols may be used, such as Wi-Fi, Wi-Fi direct, ultra-side band (UWB), and/or impulse-radio (IR) UWB communication protocols. As shown in FIG. 2, the first antenna 124 may be located in the vehicle 105. Alternatively, the first antenna 124 may be located within the vehicle modules 115. Alternatively, the first antenna 124 may be located outside of the vehicle 105. The communication module 110 also includes a near field communications (NFC) module 126 connected to a second antenna 128 and a third antenna 130. In an example implementation, the second antenna 128 is located near the exterior of the vehicle 105, for example within a door of the vehicle 105, and the third antenna is located in the interior of the vehicle 105, for example within a wireless charging cradle. In other implementations, the second antenna 128 and the third antenna 130 may be located in other suitable locations.

While FIGS. 1 and 2 illustrate the PEPS system 100 with two antennas, i.e. the second antenna 128 and the third antenna 130, connected to the NFC module 126, the NFC module 126 may be connected to any number of antennas. For example, the PEPS system 100 can include three or more antennas connected to the NFC module 126. In this way, while the present disclosure provides an example with two antennas connected to the NFC module 126, additional or fewer antennas can be used in accordance with the present disclosure.

The vehicle modules 115 can also include an authentication module 132. The authentication module 132 is configured to authenticate a portable device 134 for communication via a secure communication link 136 and to authenticate a card key 138.

The vehicle modules 115 also include a PEPS module 140 configured to provide keyless operation of some functions of the vehicle 105, e.g. entry and engine start. The vehicle modules 115 can also include a human machine interface (HMI) 142. The HMI 142 is configured to display information to a user and receive input from the user. In one example implementation, the HMI 142 may be a touch screen. In other implementations, the HMI 142 may be any suitable device capable of presenting information and receiving user input.

The vehicle modules 115 can also include a telematics module 144, such as a global positioning system (GPS) module and/or other navigation or location modules. The vehicle modules 115 can also include a body control module (BCM) 146. The BCM 146 is configured to, in response to receiving signals from the from the PEPS module 140, perform vehicle functions such as lock/unlock the doors and/or start an engine of the vehicle 105. The vehicle modules 115 also include a memory module 148. The memory module 148 is configured to store an identification (ID) of the portable device 134 and an ID of the card key 138, as well as information associated with the IDs. The vehicle modules 115 also include a temporary key module 150 configured to create and deactivate temporary keys.

As shown in FIGS. 1 and 2, the portable device 134 can communicate with the communication module 110 of the vehicle 105 via the secure communication link 136. Without limitation, the portable device 134 may be any Bluetooth enabled communication device such as a smart phone, smart watch, wearable electronic device, key fob, tablet device, or other device associated with a user of the vehicle 105, such as an owner, driver, passenger of the vehicle 105, and/or a technician for the vehicle 105. As noted above, other wireless communication protocols could be used in place of Bluetooth or BLE, such as Wi-Fi, Wi-Fi direct, UWB, and/or IR USB. The portable device 134 can include a second BLE chipset 154 connected to a fourth antenna 158. The portable device 134 can also include application software 162 stored in a computer-readable storage module or device. The portable device 134 can also optionally include a GPS module 166 or other device location service.

The portable device 134 and the communication module 110 can establish the secure communication link 136, as a Bluetooth communication link, as provided for and defined by the Bluetooth specification. For example, the secure communication link 136 between the portable device 134 and the communication module 110 can be a BLE communication link. Alternatively, as noted above, a Wi-Fi, Wi-Fi direct, UWB, and/or IR UWB communication link may be used in place of the BLE communication link. The PEPS system 100 may be configured to provide additional authentication of the secure communication link 136 with the portable device 134. The communication module 110 may communicate with the authentication module 132 to authenticate the portable device 134 and establish the secure communication link 136. For example, the authentication module 132 can be configured to implement challenge-response authentication. In addition, the communication module 110 can determine a location of the portable device 134 based on signal information measured or determine about signals sent to and from the portable device 134. For example, the signal information may include received signal strength, angle of arrival, time difference of arrival, time of arrival, and/or round trip time of flight information about signals send to and from the portable device 134 via the secure communication link 136.

The card key 138 can communicate with the communication module 110 via a near field communication link such as NFC link 170. The card key 138 can include a second NFC module 174 connected to a fifth antenna 178. The card key 138 may also include a microprocessor 182 and memory 186 connected to the second NFC module 174. The card key 138 is associated with a unique ID that is stored in the memory 186.

The PEPS module 140 is configured to determine whether the owner's portable device is connected to the communication module 110. For example, the communication module 110 may receive a unique ID from the portable device 134 and provide it to the authentication module 132. The authentication module 132 then attempts to authenticate the portable device 134, i.e. determine whether the device is the owner's device, using the challenge and response method. The PEPS module 140 is further configured to, in response to determining that portable device 134 connected to the communication module 110 is the owner's device, determine whether the user initiates a function associated with the vehicle 105. The functions may include locking/unlocking the vehicle 105 and starting the vehicle 105. The functions may also include creating a temporary key or deactivation a temporary key. In an example implementation, the PEPS module 140 may receive input from the driver of the vehicle 105 via the HMI 142. In other implementations, the owner may initiate the function through the portable device 134 and the PEPS module 140 may receive an indication of the user input.

In response to determining that the user has selected to create a temporary key, the PEPS module 140 causes the temporary key module 150 to create a temporary key. For example, the temporary key module 150, using the NFC module 126, determines whether a card key is located near one of the NFC antennas. In response to determining that the card key 138 is located near either the second antenna 128 or the third antenna 130, the temporary key module 150 causes the NFC module 126 to read the unique ID associated with the card key 138 via the NFC link 170. The NFC module 126 provides the unique ID to the temporary key module 150 and the temporary key module 150 stores the unique ID in the memory module 148. Then, the temporary key module 150 causes the authentication module 132 to generate a challenge response specific to the unique ID of the card key 138. The temporary key module 150 stores the generated challenge response along with the unique ID in the memory module 148. In addition, the temporary key module 150, via the NFC module 126, transmits the challenge response to the card key 138. In response to receiving the challenge response, the second NFC module 174 stores the challenge response in the memory 186.

The temporary key module 150 is configured to obtain information related to limitations of the temporary key from the driver. In an example implementation, the temporary key module 150 causes the HMI 142 to present a set of prompts to the user. In other implementations, the temporary key module 150 may present the prompts on a screen of the portable device 134, via the secure communication link 136. The presented prompts pertain to limitations of the temporary key. The limitations may include, but are not limited to, a time period when the temporary key is valid, a number of permitted engine starts, a max vehicle speed, and/or a geographic operating area of the temporary key card.

The time period when the temporary key is valid is the period of time that the temporary key may be used to operate the vehicle, e.g. 6:00 pm Dec. 4, 2019 to 9:00 am Dec. 5, 2019. The number of engine starts is the total number of times that the temporary key may be used to start an engine of the vehicle 105. The max vehicle speed is the maximum speed that the vehicle 105 may operate at when the temporary key is used to start the engine of the vehicle 105. The geographic operating area is a geographic region in which the temporary key is authorized. One example is within 2 miles of the current location. Another example may be a specific number of miles away from a specified location, for example a location selected on a map. The driver's responses are received, either via the HMI 142 or the portable device and are sent to the temporary key module 150. In response to receiving the inputted limitations, the temporary key module 150 stores the limitations in the memory module 148 with the unique ID of the card key 138.

The PEPS module 140 is further configured to determine when the card key 138 is placed near one of the NFC antennas. For example, when the card key 138 is placed near the second antenna 128, the NFC module 126 reads the unique ID of the card key 138 via the NFC link 170 and provides the ID to the authentication module 132. The authentication module 132 is configured to, in response to receiving the ID, compare the ID to IDs stored in the memory module 148. If the authentication module 132 determines that the received ID matches an ID stored in the memory module 148, using the NFC module 126, the authentication module 132 transmits a query to the card key 138. The transmitted query includes a value.

In response to receiving the query, the card key 138 uses the received query and the algorithm stored in the memory 186 to generate a response. For example, the microprocessor 182 is configured to read the algorithm from the memory 186 and use the value in the received query as input to the algorithm to generate a response. The microprocessor 182 is further configured to provide the generated response to the second NFC module 174. The second NFC module 174 is configured to transmit the response to the NFC module 126.

The NFC module 126 is configured to receive the response from the card key 138 and provide the received response to the authentication module 132. The authentication module 132 is configured to use the value included in the query transmitted to the card key 138 and the challenge response stored with the matching ID in the memory module 148 to generate an authentication response. The authentication module 132 is further configured to compare the received response with the authentication response. In response to the authentication module 132 determining that the received response and the authentication response match, the authentication module 132 is configured to authenticate the card key 138 and provide the authentication to the PEPS module 140. In response to the authentication module 132 determining that the received response and the authentication response do not match, the authentication module 132 is configured to not authenticate the card key 138.

The PEPS module 140 is configured to, in response to receiving authentication of the card key 138, determine whether an operation of the vehicle 105 has been requested. In response to determining that the user has initiated an operation of the vehicle 105, the PEPS module 140 compares the requested operation to the limitations stored with the ID of the card key 138 and determines whether the requested operation is permitted. For example, if the requested operation is a lock/unlock operation, the PEPS module 140 determines if the current time is within the stored valid time period. If the current time is within the stored valid time period, the PEPS module 140 causes the BCM 146 to complete the lock/unlock operation, e.g. unlock the vehicle 105. If the requested operation is an engine start, the PEPS module 140 not only determines whether the current time period is within the valid operating period, but also determines whether the requested operation satisfies all of the other limitations stored in the memory module 148 with the unique ID, for example, the permitted number of engines starts and the permitted geographical location. The PEPS module 140 may use the telematics module 144 to determine the current location of the vehicle 105. If the current location satisfies the stored geographical limitation and the number of engine starts is greater than zero, the PEPS module 140 completes the engine start operation. For example, the PEPS module 140 may cause the BCM 146 to start the engine of the vehicle 105. In response to completing the engine start operation, the PEPS module 140 decrements the number of permitted engine starts associated with the unique ID by one and then stores the result in the memory module 148 as the new number of permitted engine starts associated with the ID.

In response to the PEPS module 140 determining that the user has selected to deactivate a temporary key, the temporary key module 150 is configured to deactivate a temporary key associated with an ID stored in the memory module 148. For example, the temporary key module 150, using the NFC module 126, is configured to determine if a card key, e.g. card key 138, is located near an NFC antenna. If the temporary key module 150 determines that the card key is located near an NFC antenna, the NFC module 126 reads the ID of the card key 138 via the NFC link 170 and provides the ID to the temporary key module 150 as the ID of the temporary key to be deactivated.

If the temporary key module 150 determines that a card key is not near the NFC antennas, the temporary key module 150 may cause a list of IDs stored in the memory module 148 to be displayed to the driver. For example, the temporary key module 150 may cause the HMI 142 to display the list of IDs or the temporary key module 150 may cause the list of IDs to be displayed on the screen of the portable device 134. In response to the driver selecting one of the displayed IDs, the HMI 142 or the portable device 134, provides the selected ID to the temporary key module 150 as the ID of the temporary key to be deactivated.

The temporary key module 150 then revokes the rights associated with the received ID. For example. For example, the temporary key module 150 may delete the selected ID and all data associated with the ID, e.g. challenge response and limitations, from the memory module 148. The temporary key module 150 may also revoke the rights associated with the received ID by changing the limitations stored in the memory module 148 that are associated with the selected ID. For example, the temporary key module 150 may store the value zero as the number of permitted engine starts associated with the received ID in the memory module 148.

Figure 3:
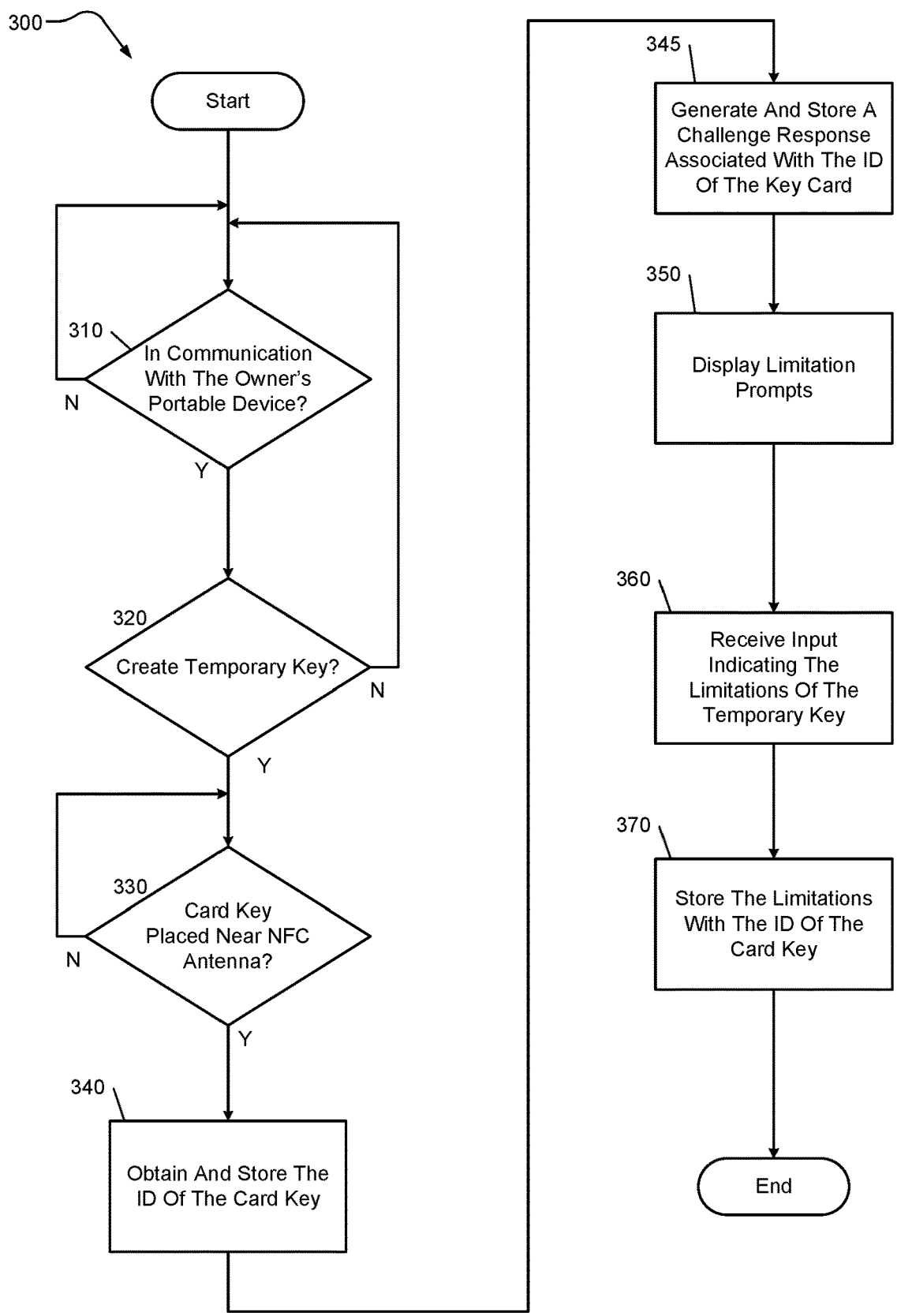
FIG. 3 illustrates a method, according to the present disclosure, for creating a temporary key.

With continued reference to FIGS. 1 and 2 and additional reference to FIG. 3, a method according to the present teachings for creating a temporary key to be used with a vehicle that employs a PEPS system, such as the vehicle 105, is generally illustrated at reference numeral 300. The method 300 can be performed by the PEPS system 100, or by any other suitable system or module.

Control begins at 310. At 310, the PEPS system 100 determines if the vehicle 105 owner's portable device is in communication with the communications module 110. For example, the PEPS module 140 may use the authentication module 132 to authenticate the portable device 134. In response to the authentication module 132 authenticating the portable device 134, for example with a challenge and response method, the PEPS module 140 determines that the owner's portable device is in communication with the communication module 110. In response to the authentication module 132 not authenticating the portable device 134, the PEPS module 140 determines that the owner's portable device is not in communication with the communication module 110. If 310 is false, control remains with 310. If 310 is true, control continues with 320.

At 320, the PEPS system 100 determines if the driver has requested to create a temporary key. For example. The PEPS module 140 may receive an indication from the HMI 142 that the driver has provided input that indicates that the driver has requested to make a temporary key, e.g. the driver selected a create temporary key icon on a touchscreen. If 320 is false, control returns to 310. If 320 is true, control continues with 330.

At 330, the temporary key module 150 determines if a card key is located near an NFC antenna. For example, the temporary key module 150 may use the NFC module 126 to determine if the card key 138 is near either the second antenna 128 or the third antenna 130. If 330 is false, control remains at 330. If 330 is true, control continues with 340.

At 340, the temporary key module 150 obtains and stores the unique ID of the card key 138. For example, the temporary key module 150 may cause the NFC module 126 to query the card key 138. In response to receiving the query from the NFC module 126, the second NFC module 174 retrieves the unique ID of the card key 138 stored in memory 186 and transmits it to the NFC module 126 via the NFC link 170. In response to receiving the unique ID, the NFC module 126 provides the unique ID to the temporary key module 150. The temporary key module 150 then stores the ID in the memory module 148. Control then progresses to 345.

At 345, a challenge response specific to the unique ID of the card key 138 is generated and stored. For example, the temporary key module 150 causes the authentication module 132 to generate the challenge response. Then, the temporary key module 150 stores the generated challenge response with the unique ID in the memory module 148. In addition, the temporary key module 150, via the NFC module 126, transmits the challenge response to the card key 138. In response to receiving the challenge response, the second NFC module 174 stores the challenge response in the memory 186. Control then continues with 350.

At 350, prompts related to the limitations of the temporary key are displayed. For example, the temporary key module 150 may cause the HMI 142 to display the prompts on a touchscreen. Alternatively or in addition, the temporary key module 150 may cause the prompts to be displayed on a screen of the portable device 134. Control then progresses to 360.

At 360, the temporary key module 150 receives input indicating the limitations associated with the temporary key. For example, the input may indicate a time period when the temporary key is valid, a number of permitted engine starts, a max vehicle speed, and/or a geographic operating area of the temporary key card. The temporary key module 150 may receive the input from the HMI 142 or from the portable device 134. Control then continues with 370.

At 370, the temporary key module stores the limitations of the temporary key indicated by the received input. For example, the temporary key module 150 stores the limitations with the unique ID of the card key 138 in the memory module 148. Control then ends.

Figure 4:
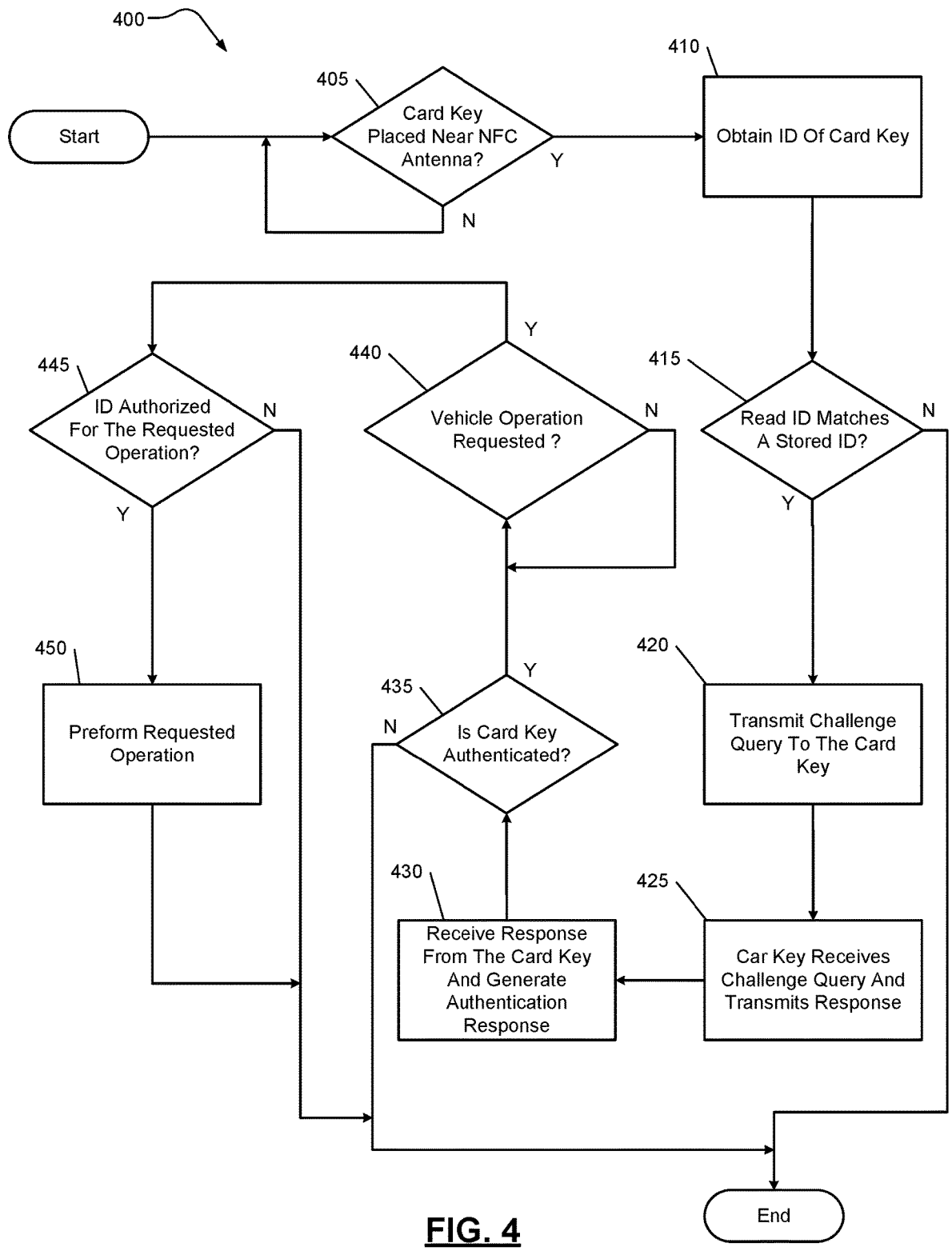
FIG. 4 illustrates a method, according to the present disclosure, for using a temporary key in the PEPS system.

With continued reference to FIGS. 1 and 2 and additional reference to FIG. 4, a method according to the present teachings for using a temporary key to operate a vehicle that employs a PEPS system, such as the vehicle 105, is generally illustrated at reference numeral 400. The method 400 can be performed by the PEPS system 100, or by any other suitable system or module.

Control begins at 405. At 405, the PEPS system 100 determines when a card key is placed near an NFC antenna. For example, the PEPS module 140 uses the NFC module 126 to determine whether the card key 138 is placed near either the second antenna 128 or the third antenna 130. If 405 is false, control remains with 405. If 405 is true, control continues with 410.

At 410, the ID of the car key is obtained. For example, the NFC module 126 reads the unique ID of the card key 138 via the NFC link 170 and provides the ID to the authentication module 132. Control then continues with 415. At 415, the PEPS system 100 determines if the ID of the card key 138 matches a stored ID. For example, the authentication module 132 compares the ID of the card key 138 to the IDs stored in the memory module 148. If 415 is false, control ends. If 415 is true, control continues.

At 420, the authentication module 132 transmits a challenge query that includes a value to the card key 138. For example, the authentication module 132 may use the NFC module 126 to transmit the query to the card key 138 via the NFC link 170. Control then progress to 425.

At 425, the card key 138 receives the query that includes the value. The card key 138 then uses the received value and the algorithm stored in the memory 186 to generate a response. For example, the microprocessor 182 reads the algorithm from the memory 186 and uses the value in the received query as an input to the algorithm to generate a response. The microprocessor 182 then provides the generated response to the second NFC module 174. The second NFC module 174 transmits the response to the NFC module 126. Control then continues with 430.

At 430, the NFC module 126 receives the response from the card key 138 and provides the received response to the authentication module 132. Then, the authentication module 132 uses the value included in the query transmitted to the card key 138 and the challenge response stored with the matching ID in the memory module 148 to generate an authentication response. Control then continues with 435.

At 435, PEPS system 100 determines if the card key 138 is authenticated. For example, the authentication module 132 compares the received response with the generated authentication response. In response to the authentication module 132 determining that the received response and the authentication response match, the authentication module 132 authenticates the card key 138 and provides the authentication to the PEPS module 140. In response to the authentication module 132 determining that the received response and the authentication response do not match, the authentication module 132 does not authenticate the card key 138. If 435 is false, control ends. If 435 is true, control continues with 440.

At 440, the PEPS system 100 determines whether an operation of the vehicle 105 has been requested. For example, the PEPS module 140 determines if a user has actuated a switch to either lock/unlock the vehicle 105 or start the engine of the vehicle 105. If 440 is false, control remains with 440. If 440 is true, control continues with 445.

At 445, the PEPS system 100 determines if the temporary key is authorized to for the requested operation. The PEPS module 140 compares the requested operation to the limitations stored with the ID of the card key 138 in the memory module 148 and determines whether the requested operation is permitted. As an example, if the requested operation is a lock/unlock operation, the PEPS module 140 may determine if the current time is within the stored valid time period associated with the ID of the card key 138. As another example, if the requested operation is an engine start, the PEPS module 140 may determine whether the current time period is within the valid operating period and whether the requested operation satisfies all of the other limitations stored in the memory module 148 with the unique ID. Determining whether the requested operation satisfies the stored limitations may include determining that the the permitted number of engine starts is greater than zero and that the current location of the vehicle 105 is within the permitted geographical operating area. The PEPS module 140 may use the telematics module 144 to determine the current location of the vehicle 105. If 445 is false, control ends. If 445 is true, control continues with 450.

At 450, the PEPS system 100 performs the requested operation. For example, the PEPS module 140 may cause the BCM 146 to either lock/unlock the vehicle 105 or start the engine of the vehicle 105. In response to completing an engine start operation, the PEPS module 140 decrements the number of permitted engine starts associated with the ID of the card key 138 by one and then stores the result in the memory module 148 as the new number of permitted engine starts associated with the ID of the card key 138. Control then ends.

Figure 5:
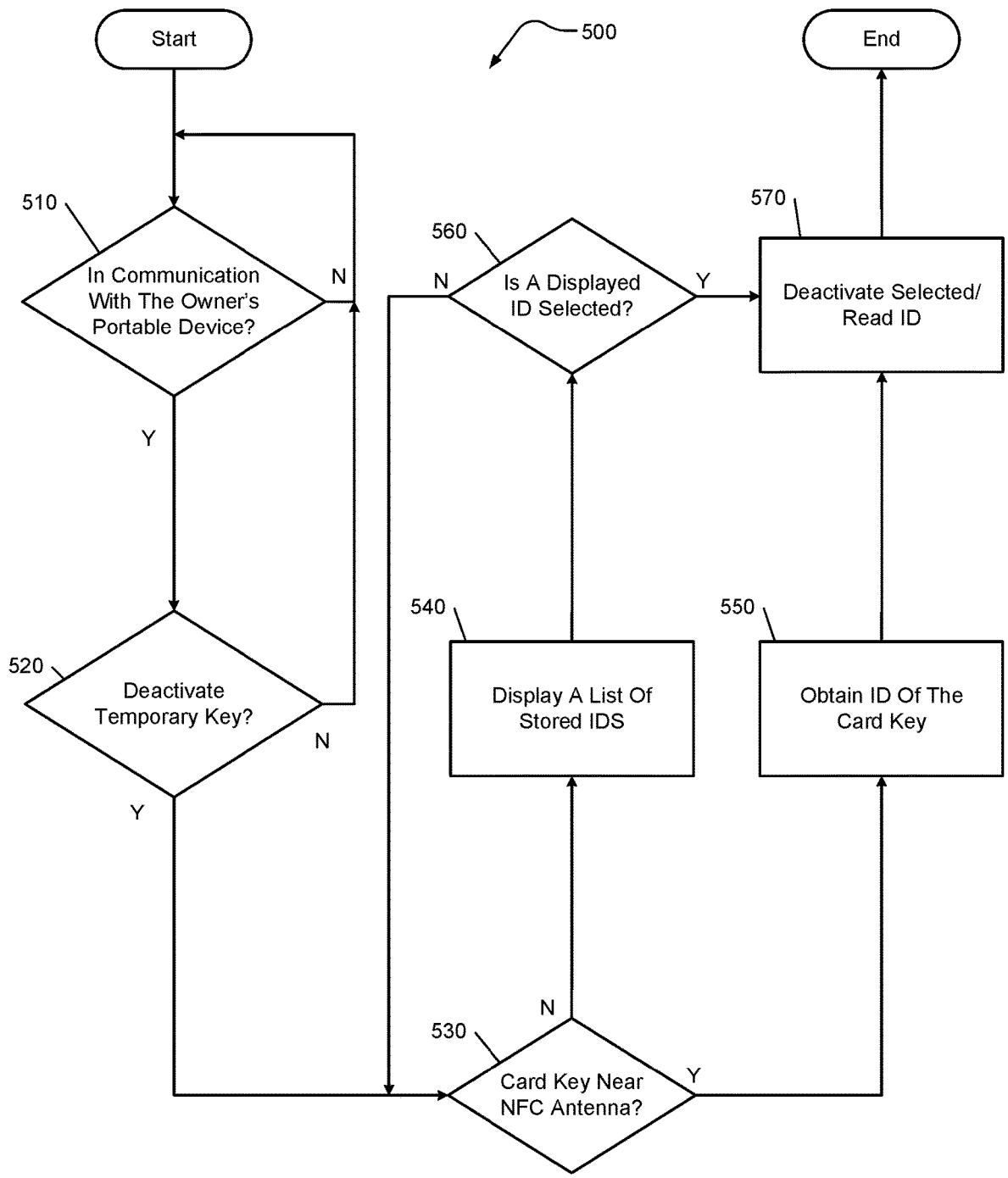
FIG. 5 illustrates a method, according to the present disclosure, for deactivating a temporary key.

With continued reference to FIGS. 1 and 2 and additional reference to FIG. 5, a method according to the present teachings for deactivating a temporary key is generally illustrated at reference numeral 500. The method 500 can be performed by the PEPS system 100, or by any other suitable system or module.

Control begins at 510. At 510, the PEPS module 140 determines if the vehicle 105 owner's portable device is in communication with the communication module 110. For example, the PEPS module 140 may use the authentication module 132 to authenticate the portable device 134. In response to the authentication module 132 authenticating the portable device 134, for example with a challenge and response method, the PEPS module 140 determines that the owner's portable device is in communication with the communication module 110. In response to the authentication module 132 not authenticating the portable device 134, the PEPS module 140 determines that the owner's portable device is not in communication with the communication module 110. If 510 is false, control remains with 510. If 510 is true, control continue with 520.

At 520, the PEPS system 100 determines if the driver has requested to deactivate a temporary key. For example. The PEPS module 140 may receive an indication from the HMI 142 that the driver has provided input that indicates that the driver has requested to deactivate a temporary key, e.g. the driver selected a deactivate temporary key icon on a touchscreen. If 520 is false, control returns to 510. If 520 is true, control continues with 530.

At 530, the temporary key module 150 determines if a card key is located near an NFC antenna. For examples, the temporary key module 150 may use the NFC module 126 to determine if the card key 138 is near either the second antenna 128 or the third antenna 130. If 530 is false, control continues with 540. If 530 is true, control continues with 550, as described below.

At 540, a list of IDs stored in the memory module 148 is displayed. For example, the temporary key module 150 may cause the HMI 142 to display the list of IDs on a touch screen. Alternatively, the temporary key module 150 may cause the list of IDs to be displayed on a screen of the portable device 134. Control then continues with 560.

At 550, the PEPS system 100 determines whether one of the displayed IDs is selected. For example, in response to a displayed ID being selected, the temporary key module 150 may receive the selected ID as the ID of the temporary key to be deactivated. Control then continues with 570.

At 560, the temporary key module 150 obtains the ID of the card key 138. For example the temporary key module 150 may cause the NFC module 126 to query the card key 138. In response to receiving the query from the NFC module 126, the second NFC module 174 retrieves the ID of the card key 138 stored in memory 186 and transmits it to the NFC module 126 via the NFC link 170. In response to receiving the ID of the card key 138, the NFC module 126 provides the received ID to the temporary key module 150 as the ID of the temporary key to be deactivated. Control then continues with 370.

At 570, the PEPS system 100 deactivates the temporary key card. For example, the temporary key module 150 may delete the selected/obtained ID and all data associated with the ID, e.g. challenge response and limitations, from the memory module 148. Alternatively, the temporary key module 150 may revoke the rights associated with the received ID by changing the limitations stored in the memory module 148 that are associated with the selected/obtained ID. As an example, the temporary key module 150 may store the value zero as the number of permitted engine starts associated with the selected/obtained ID in the memory module 148. Control then ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a communication module configured to:
      establish a first secure communications link with a portable device using one of a Bluetooth Low Energy (BLE) communication protocol, a Wi-Fi communication protocol, a Wi-Fi direct communication protocol, an ultra-wide band (UWB) communication protocol, or an impulse-radio (IR) UWB communication protocol, and
      establish a second secure communications link with a contactless smartcard using a near field communication (NFC) protocol, wherein the contactless smartcard includes a unique identification (ID);
   a memory module configured to store information associated with the portable device and the contactless smartcard;
   a temporary key module configured to:
      store the ID of the contactless smartcard in the memory module, and
      store vehicle operation limitations associated with the ID of the contactless smartcard in the memory module;
   an authentication module configured to (i) authenticate the portable device and (ii) authenticate the contactless smartcard; and
   a passive entry/passive start (PEPS) module configured to:
      receive authentication of at least (i) the portable device or (ii) the contactless smartcard from the authentication module, and
      perform a vehicle operation based on at least (i) the received authentication and (ii) the vehicle operation limitations stored in the memory module.

2. The system of claim 1, wherein the vehicle operation includes one of locking the vehicle, unlocking the vehicle, or starting an engine of the vehicle.

3. The system of claim 1, wherein:
   the contactless smartcard includes:
      a first NFC module,
      a first NFC antenna,
      a microprocessor, and
      a memory,
   the first NFC module is connected to both the microprocessor and the memory, and
   the first NFC antenna is connected to the first NFC module.

4. The system of claim 3, wherein:
   the communication module includes (i) a second NFC module and (ii) a second NFC antenna.

5. The system of claim 4, wherein the second NFC antenna is located in a wireless charger inside of the vehicle.

6. The system of claim 1, further comprising a human machine interface (HMI) configured to (i) display information and (ii) receive input,
   wherein the temporary key module is configured to:
      display prompts on the HMI related to the vehicle operation limitations, and
      receive inputs indicating the vehicle operation limitations associated with the contactless smartcard.

7. The system of claim 6, wherein the vehicle operation limitations associated with the ID of the contactless smartcard include:
   a valid time, wherein the valid time is a time period that the PEPS module performs the vehicle operation in response to receiving authentication of the contactless smartcard,
   a number of engine starts, wherein the number of engine starts is the number of engines starts that the PEPS module performs in response to receiving authentication of the contactless smartcard,
   a max speed, wherein the max speed is the maximum speed that a vehicle may travel in response to the PEPS receiving authentication of the contactless smartcard, and
   a geographic operating area, wherein the geographic operating area is a region that the PEPS module performs the vehicle operation in response to receiving authentication of the contactless smartcard.

8. The system of claim 6, wherein the temporary key module is further configured to deactivate the contactless smartcard.

9. The system of claim 8, wherein deactivating the contactless smartcard includes one of:
   deleting the ID of the contactless smartcard from the memory module, or
   changing the vehicle operation limitations associated with the ID of the contactless smartcard in the memory module.

10. The system of claim 6, wherein performing the vehicle operation incudes determining whether the stored vehicle operation limitations associated with the ID of the contactless smartcard are satisfied.

11. A method comprising:
   establishing a first secure communications link with a portable device using one of a Bluetooth Low Energy (BLE) communication protocol, a Wi-Fi communication protocol, a Wi-Fi direct communication protocol, an ultra-wide band (UWB) communication protocol, or an impulse-radio (IR) UWB communication protocol;

establishing a second secure communications link with contactless smartcard using a near field communication (NFC) protocol, wherein the contactless smartcard includes a unique identification (ID);

storing information associated with the contactless smartcard, wherein the information includes (i) the ID of the contactless smartcard and (ii) vehicle operation limitations associated with the ID of the contactless smartcard;

authenticating (i) the portable device and (ii) the contactless smartcard; and performing a vehicle operation based on at least (i) the authentication of the portable device or the authentication of the contactless smartcard and (ii) the stored vehicle operation limitations.

12. The method of claim 11, wherein the vehicle operation includes one of locking a vehicle, unlocking the vehicle, or starting an engine of the vehicle.

13. The method of claim 11, wherein:
the contactless smartcard includes:
a first NFC module,
a first NFC antenna,
a microprocessor, and
a memory,
the first NFC module is connected to both the microprocessor and the memory, and
the first NFC antenna is connected to the first NFC module.

14. The method of claim 13, wherein the contactless smartcard is located in a wireless charger inside of the vehicle.

15. The method of claim 11, further comprising:
displaying prompts on a human machine interface (HMI) related to vehicle operation limitations,
receiving inputs indicating the vehicle operation limitations associated with the ID of the contactless smartcard.

16. The method of claim 15, wherein the limitations associated with the ID of the contactless smartcard include:
a valid time, wherein the valid time is a time period the vehicle operation is performed in response to authentication of the contactless smartcard,
a number of engine starts, wherein the number of engine starts is the number of engine starts performed in response to authentication of the contactless smartcard,
a max speed, wherein the max speed is the maximum speed that the vehicle may travel in response to authentication of the contactless smartcard, and
a geographic operating area, wherein the geographic operating area is a region in which the vehicle operation is performed in response to authentication of the contactless smartcard.

17. The method of claim 15, further comprising deactivating the contactless smartcard.

18. The method of claim 17, wherein deactivating the contactless smartcard includes one of:
deleting the ID of the contactless smartcard, or
changing the vehicle operation limitations associated with the ID of the contactless smartcard.

19. The method of claim 15, wherein performing the vehicle operation incudes determining whether the stored vehicle operation limitations associated with the ID of the contactless smartcard are satisfied.

20. A method comprising:
establishing, with a communication module of a vehicle, a first secure communications link with a portable device using a wireless communication protocol;
authenticating, with an authentication module of the vehicle, the portable device;
receiving, with one of a human machine interface of the vehicle or the portable device, input selecting a temporary key creation process;
in response to authenticating the portable device and to receiving the input selecting the temporary key creation process, performing the temporary key creation process with a temporary key module of the vehicle by (i) determining whether a contactless key card is located at a near field communication (NFC) antenna of the vehicle, (ii) receiving a unique identifier (ID) from the contactless key card using the NFC antenna in response to determining that the contactless key card is located at the NFC antenna, (iii) receiving vehicle operation limitations to be associated with the contactless key card from one of the human machine interface or the portable device, (iv) receiving a time period to be associated with the contactless key card from one of the human machine interface or the portable device, and (v) storing the unique ID of the contactless key card with the vehicle operation limitations and the time period in a memory module of the vehicle;
establishing, with the communication module, a second secure communications link with the contactless smartcard using an NFC protocol after performing the temporary key creation process;
authenticating, with the authentication module, the contactless smartcard;
retrieving, with a passive entry/passive start (PEPS) module of the vehicle, the time period and the vehicle operation limitations associated with the contactless smartcard in response to authenticating the contactless smartcard;
determining, with the PEPS module, whether a current time is within the retrieved time period associated with the contactless smart card; and
enabling, with the PEPS module, at least one vehicle operation of the vehicle based on the vehicle operation limitations stored in the memory module and in response to authenticating the contactless smartcard and to determining that the current time is within the retrieved time period associated with the contactless smart card.

* * * * *

UNITED STATES PATENT AND TRADEMARK OFFICE
CERTIFICATE OF CORRECTION

PATENT NO. : 11,097,689 B2
APPLICATION NO. : 16/359103
DATED : August 24, 2021
INVENTOR(S) : Kyle Golsch It is certified that error appears in the above-identified patent and that said Letters Patent is hereby corrected as shown below:

In the Claims

Column 14, Line 60: In Claim 10, delete "incudes" and insert --includes-- therefor Column 16, Line 5: In Claim 19, delete "incudes" and insert --includes-- therefor Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*